US008632875B2

(12) United States Patent
Oldorff

(10) Patent No.: US 8,632,875 B2
(45) Date of Patent: Jan. 21, 2014

(54) METHOD FOR PRODUCING PANELS AND PANEL PRODUCED ACCORDING TO THE METHOD

(75) Inventor: Frank Oldorff, Schwerin (DE)

(73) Assignee: Flooring Technologies Ltd., Pieta (MT)

( * ) Notice: Subject to any disclaimer, the term of this patent is extended or adjusted under 35 U.S.C. 154(b) by 538 days.

(21) Appl. No.: 12/996,256

(22) PCT Filed: Mar. 10, 2010

(86) PCT No.: PCT/EP2010/001473
§ 371 (c)(1),
(2), (4) Date: Feb. 7, 2011

(87) PCT Pub. No.: WO2010/112125
PCT Pub. Date: Oct. 7, 2010

(65) Prior Publication Data

US 2011/0117340 A1 May 19, 2011

(30) Foreign Application Priority Data

Mar. 31, 2009 (EP) .................................... 09004656

(51) Int. Cl.
*B32B 7/02* (2006.01)
*B23P 17/00* (2006.01)

(52) U.S. Cl.
USPC ........................... 428/213; 428/220; 29/527.2

(58) Field of Classification Search
USPC .......................................... 428/213; 29/527.2
See application file for complete search history.

(56) References Cited

U.S. PATENT DOCUMENTS 3,844,080 A * 10/1974 Brock et al. .................... 52/222
5,348,621 A * 9/1994 Rudy ............................ 162/100

(Continued)

FOREIGN PATENT DOCUMENTS

DE 4310685 A1 10/1994
DE 19532819 A1 3/1997

(Continued)

OTHER PUBLICATIONS

International Preliminary Report on Patentability for App. No. PCT/EP2010/001473, issued Nov. 1, 2011.
Written Opinion of the International Searching Authority for App. No. PCT/EP2010/001473, issued Nov. 1, 2011.

(Continued)

*Primary Examiner* — David Sample
*Assistant Examiner* — Tahseen N Khan
(74) *Attorney, Agent, or Firm* — Andrew M. Calderon; Roberts Mlotkowski Safran and Cole, P.C.

(57) ABSTRACT

A method for producing panels and a panel produced according to the method is provided. The method includes the following steps: a) providing a large-format, press blank particle board made of wood material including a press skin created during production at least on the top side thereof; b) grinding off a part of the press skin from the top side of the particle board; c) applying a base coat made of a liquid melamine-based resin to the top side of the particle board, wherein the resin diffuses at least partially into the top edge layer of the particle board, and at least penetrates and treats the remaining area of the press skin; d) drying the base coat; e) applying a primer over the base coat; f) drying the primer; g) applying at least one water-based paint enriched by pigments for generating a decoration; h) drying the decoration; i) applying a seal made of at least one melamine-based resin enriched with wear-resistant particles and cellulose fibers; j) drying the seal; k) applying a base coast made of a liquid melamine-based resin to the bottom side of the particle board, wherein the resin diffuses at least partially into the bottom edge layer of the particle board; l) drying the base coat; m) applying a counterpart to the bottom of the particle board; n) pressing the layer construction under the effect of pressure and temperature; o) cutting the particle board into panels of the desired width and length; p) applying binding agents and locking elements to opposite side edges for binding and locking a plurality of panels into a floating laid composite floor.

15 Claims, 1 Drawing Sheet

(56) References Cited

U.S. PATENT DOCUMENTS

| | | | | |
|---|---|---|---|---|
| 5,490,900 | A | 2/1996 | Held | |
| 2004/0123555 | A1 * | 7/2004 | Cole | 52/782.1 |
| 2005/0208255 | A1 | 9/2005 | Pervan | |
| 2007/0193174 | A1 * | 8/2007 | Vogel et al. | 52/483.1 |
| 2007/0245640 | A1 * | 10/2007 | Bergqvist | 52/92.2 |
| 2008/0008871 | A1 | 1/2008 | Pervan | |
| 2009/0315437 | A1 * | 12/2009 | Lee | 312/326 |

FOREIGN PATENT DOCUMENTS

| | | | |
|---|---|---|---|
| DE | 19751115 | A1 | 5/1999 |
| DE | 102004056585 | A1 | 6/2006 |
| EP | 0536795 | A1 | 4/1993 |
| EP | 1454763 | A2 | 9/2004 |
| EP | 1754583 | A1 | 2/2007 |
| EP | 1977909 | A2 * | 10/2008 |
| WO | WO03/087498 | A1 | 10/2003 |

* cited by examiner

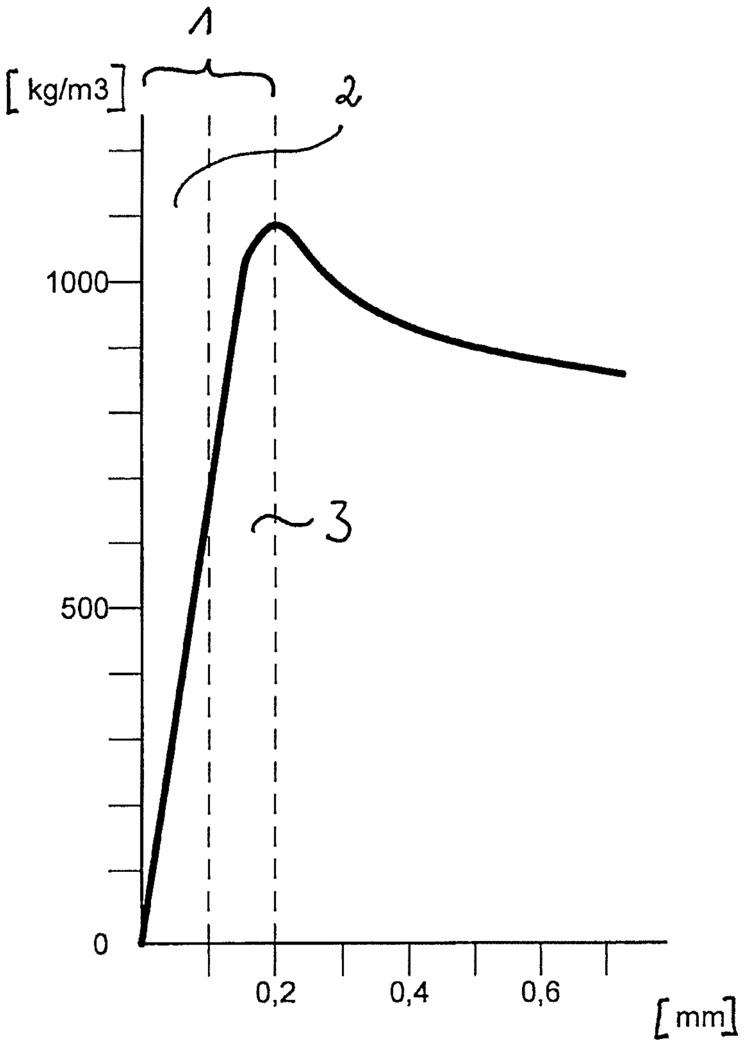
1
[kg/m3]
2
1000
3
500
0
0,2
0,4
0,6
[mm]

METHOD FOR PRODUCING PANELS AND PANEL PRODUCED ACCORDING TO THE METHOD

BACKGROUND OF THE INVENTION

1. Field of the Invention

The invention relates to a method for producing panels which are cut out of a large format support board with a core of derived timber product.

2. Discussion of Background Information

EP 1 454 763 A2 discloses a method for finishing a wooden board or a board of derived timber product, especially MDF or HDF board with a top and a bottom, in which first of all a sealing layer of melamine resin is applied to the top of the board, a decoration is imprinted onto the sealing layer and then a protective layer of melamine resin is applied to the decoration. Then the structure of the board is compressed under the action of temperature until the protective layer and the sealing layer bond are connected to one another with the inclusion of the imprinted decoration.

DE 195 32 819 A1 discloses a method for producing a board of derived timber product with an optically configurable surface in which a base dye, sealing, a print base and a decorative print are applied in succession to the board of derived timber product. The print base is built up out of a base tint or base coat of lacquer sealing and a surface lacquer. By means of engraving cylinders, a decorative print is imprinted on the print base for example in two-color printing. Finally, a multilayer acrylate UV lacquer which can be cured by means of UV light can be applied to this print.

DE 197 51 115 A1 discloses a method for coating of a panel in which at least one colored layer is applied to the surface, by means of a printing method, especially by means of screen printing. In this case the surface can be untreated, ground or pretreated, especially lacquered. Finally the applied colored layer can be covered by a coating with varnish.

In the use of direct printing technology, therefore direct imprinting of the individual layers on the support board, as a result compared to conventionally produced panels the thickness of the finished laminate panels is reduced by omitting the paper layers. This leads to problems in assembly line production when the large-format coated boards are then divided to produce the panels. To ensure that individual panels do not drop out due to insufficient thickness from DIN 13329, high quality assurance must be pursued; this on the one hand slows down production, and on the other hand also increases production costs. Ultimately irritation among dealers and/or end consumers occurs since the stack height of directly coated boards deviates visibly from conventionally coated boards.

In known board production, conventionally HDF boards are used as support boards whose surface is ground off by roughly 0.3 mm. On the top and the bottom of the support board a press skin is formed which is also called a press patina or rotting layer. The press skin is formed in the molding of the fiber cake and is produced by a hot surface of the pressure plates or belts of the press. The press skin has a thickness of roughly 0.3 mm. Since the press skin is completely ground off and roughly 0.1 mm of the core material is ground off for reducing the peak to valley height on the surface of the support board before further coating, the boards must be made thicker by a corresponding grinding additive; this adversely affects production costs. In order to manufacture a standard floor laminate which has been produced by means of direct printing technology with a thickness of 6 mm, the support board must have at least a thickness of 6.1 mm.

The press skin must be ground off because the action of heat in its region in hot pressing is so high that the adhesive sets too quickly, by which glue bridges partially break and which make the applied layer sensitive. This breaking of the glue bridges makes finished panels susceptible to raising of the decorative and wearproof layers which have been applied to the support board. This raising is called delamination; it can occur under normal loading and can be of a change in magnitude which is typical of derived timber products as a result of climatic fluctuations.

There is therefore a great demand for wearproof laminate panels which are within the thickness tolerance in the aforementioned standard. Furthermore there is a demand for a resource-saving method for production, in which extra costs from additional method steps and/or due to additional materials are largely avoided.

SUMMARY OF THE INVENTION

Proceeding from this problem formulation the initially described method for producing panels, especially floor panels, will be improved.

To solve this problem the method is characterized by the following steps:

a) making available a large-format, press blank support board of derived timber product which at least on its top has a press skin which has been formed in its production, b) grinding some of the press skin off the top of the support board, c) applying a base coat of a liquid resin based on melamine to the top of the support board, the resin diffusing at least in part into the upper edge layer of the support board and penetrating and coating the remaining area of the press skin at least in part, d) drying the base coat, e) applying a primer to the base coat, f) drying the primer, g) applying at least one water-based lacquer with dye pigments added for producing a decoration, h) drying the decoration, i) applying a seal of at least one melamine-based resin with wear resistant particles and cellulose fibers added, j) drying the seal, k) applying a base coat of a melamine-based liquid resin to the bottom of the support board, the resin diffusing at least in part into the lower edge layer of the support board, l) drying the base coat, m) applying a contacting layer to the bottom of the support board, n) molding the laminar structure under the action of pressure and temperature, o) dividing the support board into panels of the desired width and length, p) attaching connecting means and interlocking elements to opposing side edges for glueless joining and interlocking of several panels into a composite floor which has been laid floating.

This method can save almost 5% of material, by which wood, glue, and portions of the energy necessary for processing are saved. A standard 6 mm laminate panel can be produced from a support board which is 5.8 mm thick. In a conventional production method the support board must have a thickness of 6.1 mm.

Because the support board can be made thinner, the speed of the hot press and thus also its yield (amount/unit of time) rise. Since the press skin is not completely ground off, not only is handling time eliminated, which reduces production time, but also accruing costs for the grinding belts are less. Since the layer of maximum raw thickness is almost preserved, the hot pressing can be done with less pressure and/or with a higher speed. The adjustment window for hot pressing for optimization of yield consequently becomes greater.

The penetration of resin into the upper layer of the support board on the one hand compensates for the properties of the remaining press skin and at the same time forms a good substructure for a decoration and a wearproof layer. In practice it has been shown that the danger of delamination in floor panels which have been produced as claimed in the invention is low. The quality was significantly improved.

Preferably the support board is an MDF, HDF or particle board.

The thickness of the support board preferably has a thickness of 5.8 mm and the press skin has especially preferably a thickness of roughly 0.2 mm.

Preferably the press skin on the top of the support board is ground off by roughly 0.1 mm. In this way it is possible for the base coat to penetrate through the press skin to a depth of roughly 0.1 mm.

The wear resistant particles are preferably corundum particles in the sealing layer.

After dividing, a plurality of panels can be packaged into a bundle.

A floor panel with a core of derived timber product, especially of MDF, HDF or chips is characterized by the following features:

a) a top, a bottom and two pairs of opposite side edges, b) the top and the bottom of the core have a press skin which has formed during molding, c) the press skin on the top is thinner than the press skin on the bottom, d) on the top of the core a base layer, a primer layer, at least one decorative layer and one wearproof layer are applied, e) a base layer and a contacting layer are applied to the bottom of the core, f) the base layer has penetrated at least partially into the press skin on the top.

The base layer consists preferably of a melamine resin. The press skin on the top is roughly 0.1 mm thinner than on the bottom; this is preferably set by grinding off. The remaining thickness of the press skin on the top is preferably 0.1 mm.

The wearproof layer in addition to the cellulose fibers as wear resistant particles has preferably corundum particles.

DETAILED DESCRIPTION OF THE PRESENT INVENTION

The method as claimed in the invention will be explained below by way of example for a 6 mm floor laminate which satisfies DIN 13329.

First of all, a large-format, press blank support board of MDF, HDF or chip material with a thickness of roughly 5.8 mm is made available. The support board on its top and its bottom is provided with a press skin which has formed as a result of the hot press sheets during molding of the fiber cake or particle cake. On the top of the support board the press skin is ground off first of all by roughly 0.1 mm. Then the ground surface is primed with a melamine-based liquid resin. The resin diffuses with its curable components at least partially into the upper edge layer and penetrates the remaining region of the press skin by roughly 0.1 mm. This coats the press skin.

Then a drying process is carried out. A primer layer is applied to the dried base coat and then dried. At least one water-based lacquer with dye pigments added for producing a decoration is applied to the dry primer layer. The decoration can be uni-colors, wood grain, a tile mirror or a fantasy decoration. Natural stone decorations are conceivable. After the applied decorative layer has been dried, sealing with at least one resin to which wear resistant particles and cellulose fibers have been added is applied. The resin is based on melamine. Then the applied seal is dried and then the bottom of the support board is primed with a melamine-based liquid resin, the resin diffusing at least in part into the lower edge layer and optionally the lower press skin. The base coat is then completely dried and a liquid synthetic resin layer is painted onto the bottom of the support board as a contacting layer. Then this laminar structure is molded under the action of pressure and temperature.

The large-format support board which has been finished in this way is then cut into panels of the desired size. Then the opposite side edges of the divided panels with the joining means and interlocking elements corresponding to one another are profiled so that several identically made panels can be joined to one another and can be interlocked to one another in order to produce a composite floor which is laid floating.

A plurality of divided panels is packaged in the conventional manner into a bundle and if necessary warehoused.

The drawing shows an extract of a raw density profile of an HDF board for use for a floor coating. The region labeled 1 is the region which has been ground off in conventional boards. In this connection it is the so-called rotting layer (press skin) which has been completely ground off. The region labeled 2 is the region which is ground off the press skin as claimed in the invention in order to grind the top of the support board flat (leveling) because the top is not completely flat due to the press tolerance. The region labeled 3 is the region which is coated by applying the base coat and by penetration of the resin into this layer. In the diagram the raw density is given in $kg/m^3$ and the board thickness is given in mm. It is clearly recognizable that the raw density within the press skin rises quickly into a region above 1000 $kg/m^3$ and then drops again in the core toward the core middle.

The invention claimed is:

1. A method for producing panels of a laminar structure comprising:

a) making available a large-format, press blank support board of derived timber product which at least on its top has a press skin which has been formed in its production, b) grinding some of the press skin off a top of the support board, c) applying a base coat of a liquid resin based on melamine to the top of the support board, the base coat of a liquid resin diffusing at least in part into an upper edge layer of the support board and penetrating and coating a remaining area of the press skin at least in part, d) drying the base coat of the liquid resin based on melamine, e) applying a primer to the base coat of the liquid resin based on melamine, f) drying the primer, g) applying at least one water-based lacquer with dye pigments added for producing a decoration, h) drying the decoration, i) applying a seal of at least one melamine-based resin with wear resistant particles and cellulose fibers added, j) drying the seal, k) applying a base coat of a melamine-based liquid resin to a bottom of the support board, the base coat of a melamine-based liquid resin diffusing at least in part into a lower edge layer of the support board, l) drying the base coat of the melamine-based liquid resin, m) applying a contacting layer to the bottom of the support board, n) molding the laminar structure under action of pressure and temperature, o) dividing the support board into panels of a desired width and length, p) attaching connecting mechanisms and interlocking elements to opposing side edges for glueless joining and interlocking of several panels into a composite floor which has been laid floating.

2. The method as claimed in claim 1, wherein the support board is an MDF, HDF or particle board.

3. The method as claimed in claim 1, wherein the press skin has a thickness of roughly 0.2 mm.

4. The method as claimed in claim 1, wherein the press skin is ground off by roughly 0.1 mm.

5. The method as claimed in claim 1, wherein the base coat of the liquid resin based on melamine penetrates the press skin to a depth of 0.1 mm.

6. The method as claimed in claim 1, wherein the wear resistant particles are corundum particles.

7. The method as claimed in claim 1, wherein a plurality of panels are packaged into a bundle.

8. A panel with a compressed core of derived timber product, comprising:

a) a top, a bottom and two pairs of opposite side edges, b) the top and the bottom of the core have a press skin which has formed during molding, c) the press skin on the top is thinner than the press skin on the bottom, d) a base layer, a primer layer, at least one decorative layer and one wearproof layer are applied on the top of the core, e) a base layer and a contacting layer are applied to the bottom of the core, and f) the base layer has penetrated at least partially into the press skin on the top.

9. The panel as claimed in claim 8, wherein the base layer comprises a melamine resin.

10. The panel as claimed in claim 8, wherein the press skin on the top is roughly 0.1 mm thinner than on the bottom.

11. The panel as claimed in claim 8, wherein the wearproof layer has cellulose fibers and wear resistant particles.

12. The panel as claimed in claim 8, wherein the wear resistant particles are corundum particles.

13. The panel as claimed in claim 8, wherein the compressed core of derived timber product is medium density fiberboard (MDF), high density fiberboard (HDF) or particle board.

14. The panel as claimed in claim 8, wherein the press skin on the top is at least partially ground off.

15. The panel as claimed in claim 14, wherein the press skin has a thickness of roughly 0.1 mm.

* * * * *